(12) United States Patent
Meng et al.

(10) Patent No.: US 11,740,925 B2
(45) Date of Patent: Aug. 29, 2023

(54) METHOD AND APPARATUS FOR ONLINE MIGRATION OF MULTI-DISK VIRTUAL MACHINE INTO DIFFERENT STORAGE POOLS

(71) Applicant: INSPUR SUZHOU INTELLIGENT TECHNOLOGY CO., LTD., Jiangsu (CN)

(72) Inventors: Linglu Meng, Jiangsu (CN); Dong Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/016,998

(22) PCT Filed: Feb. 19, 2021

(86) PCT No.: PCT/CN2021/076954
§ 371 (c)(1),
(2) Date: Jan. 19, 2023

(87) PCT Pub. No.: WO2022/021856
PCT Pub. Date: Feb. 3, 2022

(65) Prior Publication Data
US 2023/0214250 A1 Jul. 6, 2023

(30) Foreign Application Priority Data
Jul. 30, 2020 (CN) .......................... 202010748839.9

(51) Int. Cl.
*G06F 9/455* (2018.01)
*G06F 9/52* (2006.01)

(52) U.S. Cl.
CPC ............ *G06F 9/45558* (2013.01); *G06F 9/52* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 5,831,786 A | 11/1998 | Boutaghou et al. |
| 10,809,935 B2* | 10/2020 | Balachandran ....... G06F 3/0664 |
| 2012/0110237 A1 | 5/2012 | Li et al. |

FOREIGN PATENT DOCUMENTS

| CN | 105739918 A | 7/2016 |
| CN | 110688200 A | 1/2020 |

(Continued)

OTHER PUBLICATIONS

Corresponding International Patent Application No. PCT/CN2021/076954, International Search Report, dated May 17, 2021.
(Continued)

*Primary Examiner* — Lewis A Bullock, Jr.
*Assistant Examiner* — Melissa A Headly
(74) *Attorney, Agent, or Firm* — COOPER LEGAL GROUP, LLC (57) ABSTRACT

A method and apparatus for online migration of a multi-disk virtual machine into different storage pools are provided. The method includes: constructing disk trees by using each active disk to be migrated of a virtual machine and a plurality of snapshot disks that are correspondingly generated based on each active disk to be migrated, so as to record a generation time sequence of a plurality of disks in the disk tree; migrating a memory snapshot file; and determining a target storage pool corresponding to each active disk to be migrated, and migrating a plurality of disk trees into corre-
(Continued)

sponding target storage pools respectively according to the generation time sequence of the disk to be migrated in the disk tree.

19 Claims, 5 Drawing Sheets

(56) References Cited

FOREIGN PATENT DOCUMENTS

| CN | 110941476 A | 3/2020 |
|---|---|---|
| CN | 111090399 A | 5/2020 |
| CN | 111984370 A | 11/2020 |

OTHER PUBLICATIONS

Corresponding International Patent Application No. PCT/CN2021/076954, Written Opinion, date May 17, 2021.
Ilhoon Shin, "Dynamic Active Log Pool for Improving Worst-case Performance of Memory Cards", IEEE Transactions on Consumer Electronics, Aug. 2017, pp. 318-324, vol. 63, No. 3.
Chen Yuda, et al., "Study on Disaster Recovery Technology Scheme of Geological Survey Data", Wuhan Geological Survey Center of China Geological Survey, Wuhan 430205, Hubei), Feb. 15, 2012.
Corresponding Chinese Patent Application No. P202010748839.9, Search Report, dated Jul. 22, 2022.

\* cited by examiner

METHOD AND APPARATUS FOR ONLINE MIGRATION OF MULTI-DISK VIRTUAL MACHINE INTO DIFFERENT STORAGE POOLS

This application claims priority to Chinese Patent Application No. 202010748839.9, filed on Jul. 30, 2020, in China National Intellectual Property Administration and entitled "Method and Apparatus for Online Migration of Multi-disk Virtual Machine into Different Storage Pools", the contents of which are hereby incorporated by reference in its entirety.

FIELD

The present application relates to the field of disk migration of virtual machines, and particularly to a method and apparatus for online migration of a multi-disk virtual machine into different storage pools.

BACKGROUND

With rapid development of cloud computing technology, more and more companies have launched virtualization management systems to provide basic cloud computing functions. These virtualization management systems are deployed on servers such that all virtual machines may share resources of the servers in multiple environments.

If a host where a virtual machine currently resides is overloaded and lack of resources, or needs to perform development and maintenance on a current environment, the virtual machine is usually required to be migrated to another host or storage to reduce pressure, or the virtual machine is migrated back after maintenance of the current environment is completed.

In addition, a virtual machine is to migrate all disks of the virtual machine as a whole. If the current virtual machine occupies too many storage resources, and there is no storage pool suitable for migration of the virtual machine in a target environment, migration cannot be completed. This is not conducive to improving resource utilization and migration efficiency.

SUMMARY

In order to solve problems in the prior art, the present application creatively proposes a method and apparatus for online migration of a multi-disk virtual machine into different storage pools. The problems of low virtual machine migration resource utilization rate and low migration efficiency in the prior art are solved effectively, and the virtual machine migration efficiency and reliability are improved effectively.

Some aspects of the present application provide a method for online migration of a multi-disk virtual machine into different storage pools, the method including:
constructing a plurality of disk trees by using each of a plurality of active disks to be migrated of a virtual machine and a plurality of snapshot disks that are correspondingly generated based on each of the plurality of active disks to be migrated, each of the plurality of disk trees including at least the plurality of snapshot disks generated based on the plurality of active disks to be migrated, and being used for recording a generation time sequence of a plurality of disks in each of the plurality of disk trees;
migrating a memory snapshot file: migrating the memory snapshot file of a bootable disk of the virtual machine to a target storage pool of the bootable disk, wherein the bootable disk is a disk where an operating system of the virtual machine is located; and
determining a target storage pool corresponding to each of the plurality of active disks to be migrated, and migrating the plurality of disk trees into corresponding target storage pools respectively according to the generation time sequence of disks to be migrated in the plurality of disk trees.

In some embodiments, a number of the plurality of disk trees is correspondingly the same as a number of the plurality of active disks to be migrated.

In some embodiments, the plurality of disk trees further includes the plurality of active disks to be migrated.

In some embodiments, the migrating the plurality of disk trees into the corresponding target storage pools respectively according to the generation time sequence of the active disks to be migrated and the plurality of snapshot disks in the plurality of disk trees includes:
determining a current disk tree to be migrated;
determining whether generation time of a disk to be migrated in the current disk tree is earliest in the current disk tree, and in response to a determination that the generation time of the disk to be migrated is the earliest in the current disk tree, pre-creating an empty volume in a target storage pool corresponding to the current disk tree, and copying data in the disk to be migrated to the empty volume pre-created in the target storage pool; and
in response to a determination that the generation time of the disk to be migrated is not the earliest in the current disk tree, determining a disk to be migrated of a next level of a disk whose generation time is earliest in the current disk tree according to a time sequence of disks recorded in the current disk tree, creating a new disk in the target storage pool by a reference link, a content of the new disk being consistent with that of a disk that has been migrated before the current disk to be migrated, and migrating discrepant data between the current disk to be migrated and the disk that has been migrated before to the new disk in the target storage pool,
until the disks to be migrated in the current disk tree and all the disk trees to be migrated are completely migrated.

Further, before the disks to be migrated in the current disk tree and all the disk trees to be migrated are completely migrated, the method further includes: determining whether the disk to be migrated is an active disk, and in response to a determination that the disk to be migrated is an active disk, synchronizing the discrepant data between the current active disk to be migrated and the disk that has been migrated before with data in the new disk in the target storage pool.

In some embodiments, the active disk to be migrated is part or all of disks in the virtual machine.

In some embodiments, processes of migrating different disk trees into the corresponding target storage pools respectively are mutually independent.

In some embodiments, the snapshot disk is a disk generated by performing a snapshooting operation on the disk in the virtual machine.

In some embodiments, a format of the disk is RAW or QCOW2.

Some aspects of the present application provide an apparatus for online migration of a multi-disk virtual machine into different storage pools, the apparatus including:

a disk tree construction module, configured to construct a plurality of disk trees by using each of a plurality of active disks to be migrated of a virtual machine and a plurality of snapshot disks that are correspondingly generated by each of the plurality of active disks to be migrated, each of the plurality of disk trees including at least the plurality of snapshot disks generated by the active disk to be migrated, and being used for recording a generation time sequence of a plurality of disks in each of the plurality of disk trees;

a memory snapshot file migration module, configured to migrate a memory snapshot file: migrate the memory snapshot file of a bootable disk of the virtual machine to a target storage pool of the bootable disk, wherein the bootable disk is a disk where an operating system of the virtual machine is located; and a disk tree migration module, configured to determine a target storage pool corresponding to each of the plurality of active disks to be migrated, and migrate the plurality of disk trees into corresponding target storage pools respectively according to the generation time sequence of disks to be migrated in the plurality of disk trees.

The technical solutions used in the present application have the following technical effects.

1: According to the present application, the problems of low virtual machine migration resource utilization rate and low migration efficiency in the prior art are solved. When disks of a virtual machine are migrated, the disks to be migrated may be migrated to different target storage pools according to actual situations, whereby the virtual machine migration efficiency and reliability are improved effectively.

2: According to the present application, when disks of a virtual machine are migrated, all the disks of the virtual machine are migrated, or part of disks of the virtual machine are migrated. When an original storage pool of the virtual machine is insufficient in capacity or has excessive storage pressure, disk trees corresponding to one or more of a plurality of disks of the virtual machine are migrated into other storage pools, whereby space is saved for the original storage pool of the virtual machine, and the pressure is reduced. When the original storage pool of the virtual machine has a potential safety hazard, the virtual machine needs to be migrated to other storage pools, but there is no desired target storage pool for the oversized virtual machine, multiple target storage pools may be selected by dynamic scheduling based on this solution, thereby implementing reasonable and more flexible resource allocation.

3: According to the present application, different disk trees are migrated into corresponding target storage pools respectively, different disk trees correspond to different target storage pools, and are mutually independent without influence during migration, and even though a certain disk tree fails to be migrated, the other disk trees may also be migrated to the other storage pools. Therefore, the fault tolerance is quite high.

4: According to the present application, when the disk tree is migrated, disk migration of a disk whose generation time is not earliest may be implemented by a reference link and discrepant data migration, whereby the consistency of disk data is ensured.

5: According to the present application, when a disk tree is constructed, snapshot disks are generated based on a disk to be migrated, each of which contains all data at a snapshooting moment of the virtual machine and does not affect the others, and for a snapshot disk corresponding no active disk, a disk tree may also be constructed (the disk tree includes the snapshot disk) for disk migration. Therefore, the application scenario of disk migration is extended.

It is to be understood that the above general description and the following detailed description are only exemplary and explanatory and not intended to limit the present application.

BRIEF DESCRIPTION OF THE DRAWINGS

In order to describe the technical solutions in the embodiments of the present application or the prior art more clearly, the drawings required to be used in descriptions about the embodiments or the prior art will be introduced briefly below. Apparently, those ordinarily skilled in the art may further obtain other drawings according to these drawings without creative work.

DETAILED DESCRIPTION

In order to describe the technical features of the present solution clearly, the present application will be described below in detail with implementation modes in combination with the drawings. The following disclosure provides many different embodiments or examples to implement different structures of the present application. In order to simplify the disclosure of the present application, components and settings of examples will be described below. In addition, in the present application, reference numerals and/or letters may be reused in different examples. Such reuse is for brevity and clarity and does not indicate a relationship between each embodiment and/or setting that is discussed. It is to be noted that the components shown in the drawings are not necessarily drawn to scale. Descriptions about known components and processing technologies and processes are omitted in the present application so as to avoid unnecessary limitations on the present application.

Figure 1:
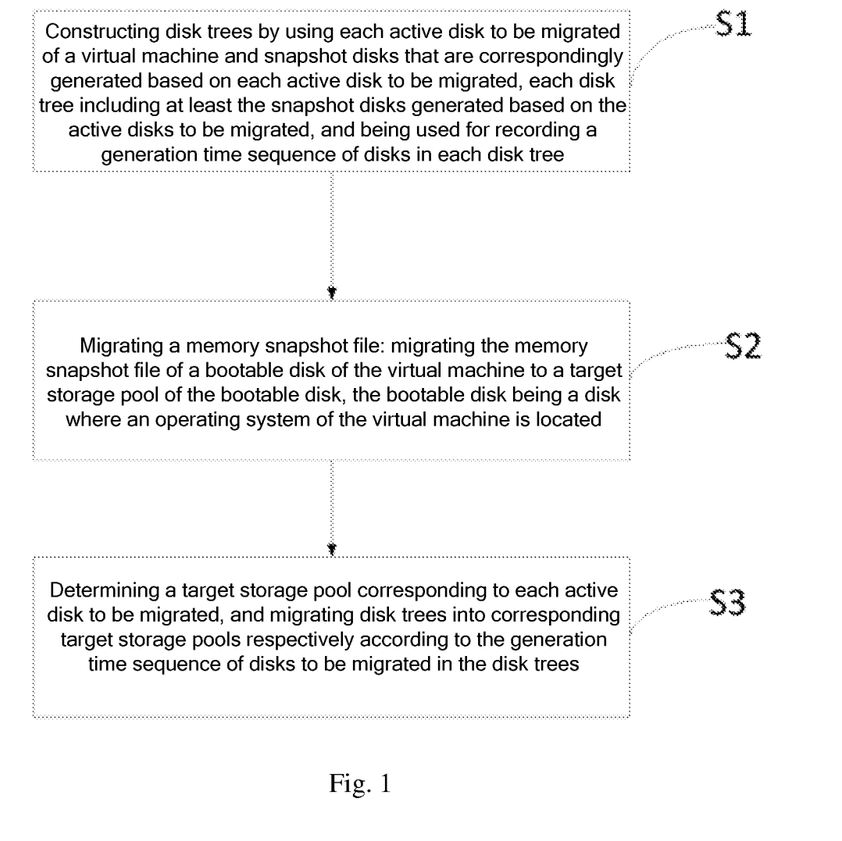
FIG. 1 is a schematic flowchart of a method according to some embodiments in solutions of the present application.

As shown in FIG. 1, the present application provides a method for online migration of a multi-disk virtual machine into different storage pools. The method includes the following steps.

In S1, disk trees are constructed by using each active disk to be migrated of a virtual machine and snapshot disks that are correspondingly generated based on each active disk to be migrated, each disk tree including at least the snapshot disks generated based on the active disks to be migrated, and being used for recording a generation time sequence of disks in each disk tree.

In S2, a memory snapshot file is migrated: the memory snapshot file of a bootable disk of the virtual machine is migrated to a target storage pool of the bootable disk, the bootable disk being a disk where an operating system of the virtual machine is located.

In S3, a target storage pool corresponding to each active disk to be migrated is determined, and disk trees are migrated into corresponding target storage pools respectively according to the generation time sequence of disks to be migrated in the disk trees.

In step S1, a number of the disk trees is correspondingly the same as that of the active disks to be migrated, and the disk tree further includes the active disk to be migrated. The active disk to be migrated may be part or all of disks in the virtual machine. The snapshot disk is a disk generated by performing a snapshooting operation on the disk in the virtual machine. When there is a certain active disk, the certain active disk corresponds to a snapshot disk, and the snapshot disk records a state of the active disk at a certain moment, and contains all data at the corresponding moment. A snapshot may correspond to no active disk. For example, under a condition that a certain active disk is deleted after snapshooting, there is no corresponding active disk for a snapshot disk, the snapshot disk is independent, and an independent disk tree needs to be constructed. A format of the disk may be RAW or QCOW2.

In step S2, a memory snapshot file is migrated: the memory snapshot file of a bootable disk of the virtual machine is migrated to a target storage pool of the bootable disk. The bootable disk is a disk where an operating system of the virtual machine is located. The bootable disk is a certain disk in the active disks. Each virtual machine has one bootable disk, like disk C of a computer.

Figure 2:
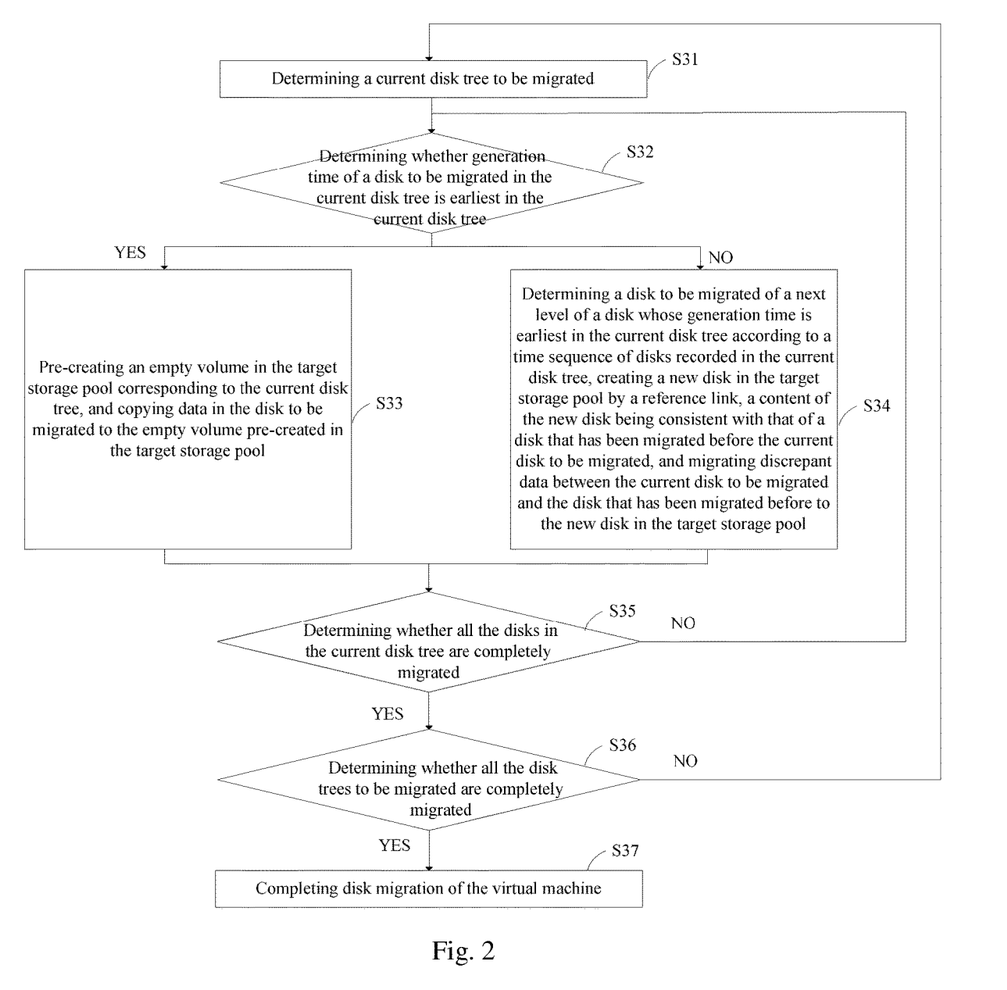
FIG. 2 is a schematic flowchart of step S3 in the method according to some embodiments in the solutions of the present application.
Figure 3:
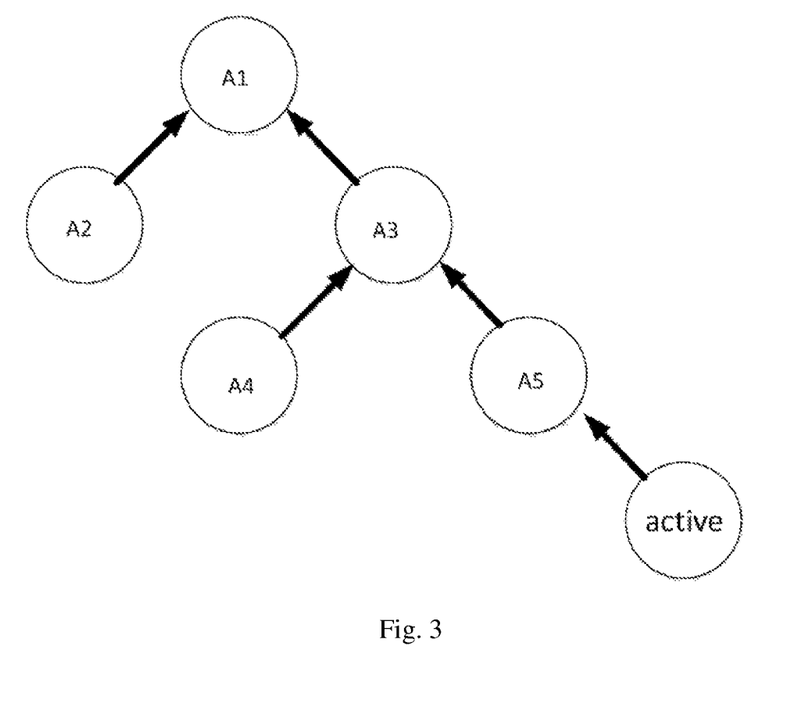
FIG. 3 is another schematic flowchart of step S3 in the method according to some embodiments in the solutions of the present application.

As shown in FIGS. 2 to 3, step S3 includes the following steps.

In S31, a current disk tree to be migrated is determined.

In S32, whether generation time of a disk to be migrated in the current disk tree is earliest in the current disk tree is determined. Under a condition that a determining result is YES, step S33 is performed, or under a condition that the determining result is NO, step S34 is performed.

In S33, an empty volume is pre-created in the target storage pool corresponding to the current disk tree, and data in the disk to be migrated is copied to the empty volume pre-created in the target storage pool.

In S34, under a condition that the generation time of the disk to be migrated is not the earliest in the current disk tree, a disk to be migrated of a next level of a disk whose generation time is earliest in the current disk tree is determined according to a time sequence of disks recorded in the current disk tree, a new disk is created in the target storage pool by a reference link, a content of the new disk being consistent with that of a disk that has been migrated before the current disk to be migrated, and discrepant data between the current disk to be migrated and the disk that has been migrated before is migrated to the new disk in the target storage pool.

In S35, whether all the disks in the current disk tree are completely migrated is determined. In response to a determination that a determining result is YES, step S36 is performed, or in response to a determination that a determining result is NO, step S32 is performed.

In S36, whether all the disk trees to be migrated are completely migrated is determined. In response to a determination that a determining result is YES, step S37 is performed, or in response to a determination that a determining result is NO, step S31 is performed.

In S37, disk migration of the virtual machine is completed.

In FIGS. 3, A1, A2, A3, A4, and A5 are five snapshot disks generated by snapshooting mapping of an active disk, where A1 is the first snapshot disk generated by snapshooting mapping of the active disk; A2 and A3 are both second-level snapshot disks generated by snapshooting mapping of the active disk based on snapshot disk A1, A2 and A3 include all data in A1, and a generation time sequence of A2 and A3 may be random; and A4 and A5 are both third-level snapshot disks generated by snapshooting mapping of the active disk based on snapshot disk A3, A4 and A5 include all data in A3, and a generation time sequence of A4 and A5 may be random. By parity of reasoning, generation time of a disk of a previous level is earlier than that of a disk of a next level. In some embodiments, generation time of the first-level disk is earlier than that of the second-level disk, and the generation time of the second-level disk is earlier than that of the third-level disk. In step S32, the disk whose generation time is earliest in the current disk tree is the first disk in the current disk tree, i.e., snapshot disk A1.

In step S33, an empty volume is pre-created in the target storage pool corresponding to the selected current disk, and data in the original disk is to be copied to the current volume. A data migration port is enabled to prepare for copying the disk, and all the data in the original disk is migrated to the pre-created volume. Migration in a volume form may save the storage space.

In step S34, under a condition that the generation time of the current disk to be migrated is not the earliest in the disk tree, namely the current disk to be migrated is not the first disk in the disk tree, and for example, is another disk except A1 in the disk tree, like A2, A3, A4, and A5, taking A5 as an example:

according to the generation time sequence of the disks recorded in the disk tree, a new disk A5* is generated in the target storage pool corresponding to the disk tree by a reflink (reference link) for a corresponding disk, i.e., A3, that has been migrated, data of A3 being consistent with that of A5*.

Discrepant data between A5 and A3 is migrated to A5*, and at this moment, data of A5 has been consistent with that of A5*, namely the current disk A5 in the disk tree is completely migrated.

In the same disk tree, the first-level disk A1 is migrated first, the second-level disks A2 and A3 are migrated respectively (A2 and A3 may be migrated partially in sequence), the third-level disks A4 and A5 are migrated respectively (A4 and A5 may be migrated partially in sequence), and so on, until all the disk in the same disk tree are completely migrated. That is, the disks of different levels in the disk tree are migrated in sequence of the disks, and the disks of the same level may be migrated in a random sequence.

Compared with conventional copying migration of disks, the manner of creating a new disk by a reflink and then migrating discrepant data has the advantages that the space is saved; and a reflink disk is very fast, so time may also be saved. In some embodiments, the reflink disk is an index node of the original disk, which keeps all information of the original disk. When the original disk exists, the reflink disk occupies no space. When the original disk is deleted, the reflink disk is not affected, and may exist independently.

Figure 4:
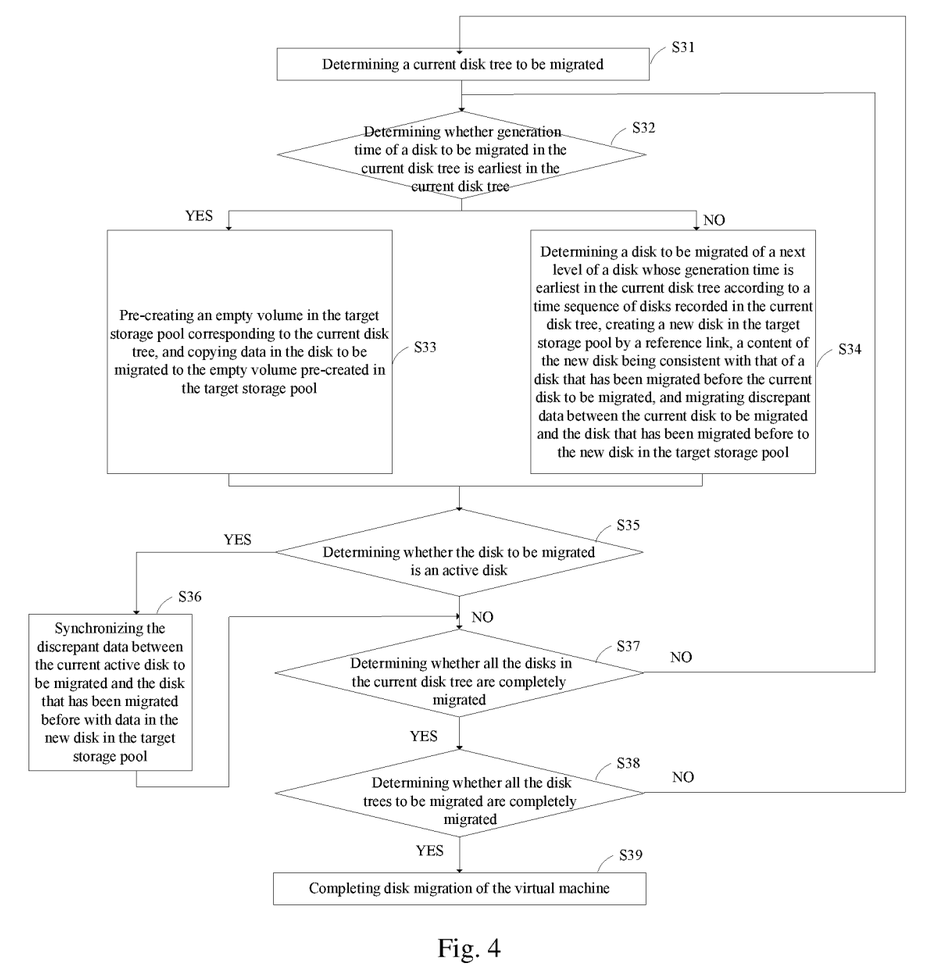
FIG. 4 is a possible schematic structural diagram of a disk tree according to some embodiments in the solutions of the present application.

Further, as shown in FIG. 4, step S3 includes the following steps.

In S31, a current disk tree to be migrated is determined.

In S32, whether generation time of a disk to be migrated in the current disk tree is earliest in the current disk tree is determined. In response to a determination that a determining result is YES, step S33 is performed, or in response to a determination that a determining result is NO, step S34 is performed.

In S33, an empty volume is pre-created in the target storage pool corresponding to the current disk tree, and data in the disk to be migrated is copied to the empty volume pre-created in the target storage pool.

In S34, under a condition that the generation time of the disk to be migrated is not the earliest in the current disk tree, a disk to be migrated of a next level of a disk whose generation time is the earliest in the current disk tree is determined according to a time sequence of disks recorded in the current disk tree, a new disk is created in the target storage pool by a reference link, a content of the new disk being consistent with that of a disk that has been migrated before the current disk to be migrated, and discrepant data between the current disk to be migrated and the disk that has been migrated before is migrated to the new disk in the target storage pool.

In S35, whether the disk to be migrated is an active disk is determined. In response to a determination that a determining result is YES, step S36 is performed, or in response to a determination that a determining result is NO, step S37 is performed.

In S36, the discrepant data between the current active disk to be migrated and the disk that has been migrated before is synchronized with data in the new disk in the target storage pool.

In S37, whether all the disks in the current disk tree are completely migrated is determined. In response to a determination that a determining result is YES, step S38 is performed, or in response to a determination that a determining result is NO, step S32 is performed.

In S38, whether all the disk trees to be migrated are completely migrated is determined. In response to a determination that a determining result is YES, step S39 is performed, or in response to a determination that a determining result is NO, step S31 is performed.

In S39, disk migration of the virtual machine is completed.

In step S36, a service is running on the virtual machine, data may be written to the active disk all the time, and as a result, data in the disk after migration may be inconsistent with that in the active disk before migration. In such case, the discrepant data between the current active disk to be migrated and the disk that has been migrated before is synchronized with data in the new disk in the target storage pool, namely discrepant data synchronization is performed on the current active disk to be migrated and the new disk in the target storage pool, thereby keeping the data consistent.

During migration of the current disk tree, the snapshot disks in the disk tree are migrated first, and the active disk in the disk tree is finally migrated. Under a condition that the active disk has been deleted from the virtual machine, it is necessary to migrate the snapshot disks generated by mapping of the original active disk in the disk tree.

The active disk to be migrated is part or all of disks in the virtual machine. Processes of migrating different disk trees into the corresponding target storage pools respectively are mutually independent.

It is to be noted that in this solution, different disk trees are migrated in a random sequence, and each disk tree may be migrated to any storage pool. During migration, one of the disk trees is randomly selected to be migrated first. Different disk trees may correspond to the same or different target storage pools, but the target storage pool in each disk tree is required to be the same.

The technical solution of the present application is mainly applied to InCloud Sphere (ICS). Types of the original storage pool and the target storage pool may both be Network File System (NFS), Cloud File Storage (CFS), or local storage pool, or may both be other types of storage pools, and no limits are made in the present application.

According to the present application, the problems of low virtual machine migration resource utilization rate and low migration efficiency in the prior art are solved. When disks of a virtual machine are migrated, the disks to be migrated may be migrated to different target storage pools according to actual situations, whereby the virtual machine migration efficiency and reliability are improved effectively.

According to the present application, when disks of a virtual machine are migrated, all the disks of the virtual machine are migrated, or part of disks of the virtual machine are migrated. When an original storage pool of the virtual machine is insufficient in capacity or has excessive storage pressure, disk trees corresponding to one or more of a plurality of disks of the virtual machine are migrated into other storage pools, whereby space is saved for the original storage pool of the virtual machine, and the pressure is reduced. When the original storage pool of the virtual machine has a potential safety hazard, the virtual machine needs to be migrated to other storage pools, but there is no desired target storage pool for the oversized virtual machine, multiple target storage pools may be selected by dynamic scheduling based on this solution, thereby implementing reasonable and more flexible resource allocation.

According to the present application, different disk trees are migrated into corresponding target storage pools respectively, different disk trees correspond to different target storage pools, and are mutually independent without influence during migration, and even though a certain disk tree fails to be migrated, the other disk trees may also be migrated to the other storage pools. Therefore, the fault tolerance is quite high.

According to the present application, when the disk tree is migrated, disk migration of a disk whose generation time is not earliest may be implemented by a reference link and discrepant data migration, whereby the consistency of disk data is ensured.

According to the present application, when a disk tree is constructed, snapshot disks are generated based on a disk to be migrated, each of which contains all data at a snapshooting moment of the virtual machine and does not affect the others, and for a snapshot disk corresponding no active disk, a disk tree may also be constructed (the disk tree includes the snapshot disk) for disk migration. Therefore, the application scenario of disk migration is extended.

Figure 5:
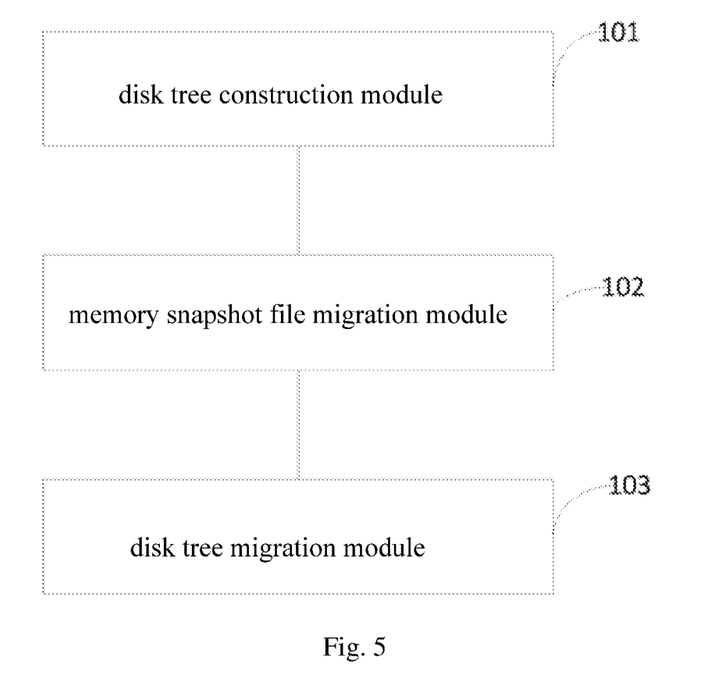
FIG. 5 is a schematic structural diagram of an apparatus according to some embodiments in the solutions of the present application.

As shown in FIG. 5, the technical solution of the present application also provides an apparatus for online migration of a multi-disk virtual machine into different storage pools. The apparatus includes:

a disk tree construction module 101, configured to construct a disk tree by using each active disk to be migrated of a virtual machine and a plurality of snapshot disks that are correspondingly generated by each active disk to be migrated, each disk tree including at least the plurality of snapshot disks generated by the active disk to be migrated, and being used for recording a generation time sequence of a plurality of disks in the disk tree;

a memory snapshot file migration module 102, configured to migrate a memory snapshot file: migrate a memory snapshot file of a bootable disk of the virtual machine to a target storage pool of the bootable disk, the bootable disk being a disk where an operating system of the virtual machine is located; and a disk tree migration module 103, configured to determine a target storage pool corresponding to each active disk to be migrated, and migrate a plurality of disk trees into corresponding target storage pools respectively according to the generation time sequence of disks to be migrated in the disk tree.

According to the present application, the problems of low virtual machine migration resource utilization rate and low migration efficiency in the prior art are solved. When disks of a virtual machine are migrated, the disks to be migrated may be migrated to different target storage pools according to actual situations, whereby the virtual machine migration efficiency and reliability are improved effectively.

According to the present application, when disks of a virtual machine are migrated, all the disks of the virtual machine are migrated, or part of disks of the virtual machine are migrated. When an original storage pool of the virtual machine is insufficient in capacity or has excessive storage pressure, disk trees corresponding to one or more of a plurality of disks of the virtual machine are migrated into other storage pools, whereby space is saved for the original storage pool of the virtual machine, and the pressure is reduced. When the original storage pool of the virtual machine has a potential safety hazard, the virtual machine needs to be migrated to other storage pools, but there is no desired target storage pool for the oversized virtual machine, multiple target storage pools may be selected by dynamic scheduling based on this solution, thereby implementing reasonable and more flexible resource allocation.

According to the present application, different disk trees are migrated into corresponding target storage pools respectively, different disk trees correspond to different target storage pools, and are mutually independent without influence during migration, and even though a certain disk tree fails to be migrated, the other disk trees may also be migrated to the other storage pools. Therefore, the fault tolerance is quite high.

According to the present application, when the disk tree is migrated, disk migration of a disk whose generation time is not the earliest may be implemented by a reference link and discrepant data migration, whereby the consistency of disk data is ensured.

According to the present application, when a disk tree is constructed, snapshot disks are generated based on a disk to be migrated, each of which contains all data at a snapshooting moment of the virtual machine and does not affect the others, and for a snapshot disk corresponding no active disk, a disk tree may also be constructed (the disk tree includes the snapshot disk) for disk migration. Therefore, the application scenario of disk migration is extended.

The above describes the implementation modes of the present application in combination with the drawings but is not intended to limit the scope of protection of the present application. Those skilled in the art should know that various modifications or transformations made based on the technical solutions of the present application without creative efforts fall within the scope of protection of the present application.

The invention claimed is:

1. A method for online migration of a multi-disk virtual machine into different storage pools, comprising:
constructing a plurality of disk trees by using each of a plurality of active disks to be migrated of a virtual machine and a plurality of snapshot disks that are correspondingly generated based on each of the plurality of active disks to be migrated, each of the plurality of disk trees comprising at least the plurality of snapshot disks generated based on the plurality of active disks to be migrated, and being used for recording a generation time sequence of a plurality of disks in each of the plurality of disk trees;

migrating a memory snapshot file of a bootable disk of the virtual machine to a target storage pool of the bootable disk, wherein the bootable disk is a disk where an operating system of the virtual machine is located; and determining a target storage pool corresponding to each of the plurality of active disks to be migrated, and migrating the plurality of disk trees into corresponding target storage pools respectively according to the generation time sequence of disks to be migrated in the plurality of disk trees, wherein the migrating the plurality of disk trees into corresponding target storage pools respectively according to the generation time sequence of disks to be migrated in the plurality of disk trees comprises:

determining a current disk tree to be migrated;

determining whether generation time of a disk to be migrated in the current disk tree is earliest in the current disk tree;

in response to a determination that the generation time of the disk to be migrated is the earliest in the current disk tree, pre-creating an empty volume in a target storage pool corresponding to the current disk tree, and copying data in the disk to be migrated to the empty volume pre-created in the target storage pool corresponding to the current disk tree; and in response to a determination that the generation time of the disk to be migrated is not the earliest in the current disk tree, determining a disk to be migrated of a next level of a disk whose generation time is earliest in the current disk tree according to a time sequence of disks recorded in the current disk tree, creating a new disk in the target storage pool corresponding to the current disk tree by a reference link, a content of the new disk being consistent with that of a disk that has been migrated before a current disk to be migrated, and migrating discrepant data between the current disk to be migrated and the disk that has been migrated before to the new disk in the target storage pool corresponding to the current disk tree, until the disks to be migrated in the current disk tree and all disk trees to be migrated are completely migrated.

2. The method for online migration of a multi-disk virtual machine into different storage pools according to claim 1, wherein a number of the plurality of disk trees is correspondingly the same as a number of the plurality of active disks to be migrated.

3. The method for online migration of a multi-disk virtual machine into different storage pools according to claim 1, wherein the plurality of disk trees further comprises the plurality of active disks to be migrated.

4. The method for online migration of a multi-disk virtual machine into different storage pools according to claim 1, wherein before the disks to be migrated in the current disk tree and all the disk trees to be migrated are completely migrated, the method further comprises:

determining whether the disk to be migrated is an active disk, and in response to a determination that the disk to be migrated is the active disk, synchronizing the discrepant data between a current active disk to be migrated and the disk that has been migrated before with data in the new disk in the target storage pool corresponding to the current disk tree.

5. The method for online migration of a multi-disk virtual machine into different storage pools according to claim 1, wherein the plurality of active disks to be migrated is part or all of disks in the virtual machine.

6. The method for online migration of a multi-disk virtual machine into different storage pools according to claim 1, wherein processes of migrating different disk trees into the corresponding target storage pools respectively are mutually independent.

7. The method for online migration of a multi-disk virtual machine into different storage pools according to claim 1, wherein each of the plurality of snapshot disks is a disk generated by performing a snapshooting operation on the disk in the virtual machine.

8. The method for online migration of a multi-disk virtual machine into different storage pools according to claim 1, wherein a format of the disks to be migrated is RAW or QCOW2.

9. The method for online migration of a multi-disk virtual machine into different storage pools according to claim 1, wherein under a condition that there is a certain active disk, the certain active disk has a corresponding snapshot disk.

10. The method for online migration of a multi-disk virtual machine into different storage pools according to claim 9, wherein under a condition that the certain active disk is deleted after snapshooting, the corresponding snapshot disk is independent.

11. The method for online migration of a multi-disk virtual machine into different storage pools according to claim 9, wherein the corresponding snapshot disk records a state of the certain active disk at a certain moment.

12. The method for online migration of a multi-disk virtual machine into different storage pools according to claim 1, wherein the determining whether generation time of a disk to be migrated in the current disk tree is earliest in the current disk tree comprises:

determining whether the disk to be migrated is a first disk in the current disk tree;

in response to a determination that the disk to be migrated is the first disk in the current disk tree, determining that the generation time of the disk to be migrated is the earliest in the current disk tree; and in response to a determination that the disk to be migrated is not the first disk in the current disk tree, determining that the generation time of the disk to be migrated is not the earliest in the current disk tree.

13. The method for online migration of a multi-disk virtual machine into different storage pools according to claim 1, wherein the copying data in the disk to be migrated to the empty volume pre-created in the target storage pool comprises:

enabling a data migration port to prepare for copying the data in the disk to be migrated to the empty volume pre-created in the target storage pool.

14. The method for online migration of a multi-disk virtual machine into different storage pools according to claim 1, wherein the new disk is an index node of an original disk.

15. The method for online migration of a multi-disk virtual machine into different storage pools according to claim 1, wherein disks of different levels in the current disk tree are migrated in order, and disks of a same level in the current disk tree are migrated in a random sequence.

16. The method for online migration of a multi-disk virtual machine into different storage pools according to claim 1, wherein different disk trees are migrated in a random sequence.

17. The method for online migration of a multi-disk virtual machine into different storage pools according to claim 1, wherein each of the plurality of disk trees is migrated to any storage pool.

18. The method for online migration of a multi-disk virtual machine into different storage pools according to claim 1, wherein different disk trees correspond to the same or different target storage pools.

19. The method for online migration of a multi-disk virtual machine into different storage pools according to claim 1, wherein the corresponding target storage pools in each of the plurality of disk trees are the same.

\* \* \* \* \*